US008622357B2

(12) United States Patent
Youngblood

(10) Patent No.: US 8,622,357 B2
(45) Date of Patent: Jan. 7, 2014

(54) LUGGAGE SUPPORT ARM

(76) Inventor: Erica Youngblood, Orlando, FL (US)

(*) Notice: Subject to any disclaimer, the term of this patent is extended or adjusted under 35 U.S.C. 154(b) by 9 days.

(21) Appl. No.: 13/167,637

(22) Filed: Jun. 23, 2011

(65) Prior Publication Data

US 2012/0199716 A1 Aug. 9, 2012

Related U.S. Application Data

(60) Provisional application No. 61/357,563, filed on Jun. 23, 2010.

(51) Int. Cl.
*E04G 3/00* (2006.01)

(52) U.S. Cl.
USPC ............... 248/276.1; 248/282.1; 280/642; 280/647; 403/103; 403/104

(58) Field of Classification Search
USPC ........... 248/95, 100, 101, 214, 215, 316.1, 248/316.7, 227.1, 228.6, 276.1, 282.1, 422; 403/104, 96, 359.1; 280/642, 647, 650
See application file for complete search history.

(56) References Cited

U.S. PATENT DOCUMENTS

| | | | | |
|---|---|---|---|---|
| 1,084,427 A * | 1/1914 | Hanks | ............... | 248/103 |
| 2,605,069 A * | 7/1952 | Gillaspy | ............... | 248/103 |
| 4,143,652 A * | 3/1979 | Meier et al. | ............... | 600/203 |
| 4,458,870 A * | 7/1984 | Duncan et al. | ............... | 248/279.1 |
| 4,735,388 A * | 4/1988 | Marks | ............... | 248/103 |
| 4,773,503 A * | 9/1988 | Purkapile | ............... | 182/22 |
| 5,100,091 A * | 3/1992 | Pollak | ............... | 248/278.1 |
| 5,609,321 A * | 3/1997 | McClellan | ............... | 248/534 |
| 5,964,439 A * | 10/1999 | Johnson | ............... | 248/278.1 |
| 6,209,835 B1 * | 4/2001 | Walrath et al. | ............... | 248/276.1 |
| 6,598,837 B1 * | 7/2003 | Howard et al. | ............... | 248/103 |
| 6,802,747 B1 * | 10/2004 | Orange | ............... | 439/773 |
| 6,834,837 B2 * | 12/2004 | Schilt et al. | ............... | 248/284.1 |
| 6,896,231 B1 * | 5/2005 | Sullivan, Sr. | ............... | 248/311.2 |
| 7,124,755 B2 * | 10/2006 | Van Hooser | ............... | 128/845 |
| 7,631,654 B2 * | 12/2009 | Blumenthal et al. | ............... | 135/16 |
| 7,896,569 B2 * | 3/2011 | Katzenstein | ............... | 403/97 |
| 8,083,196 B2 * | 12/2011 | Chang | ............... | 248/276.1 |
| 8,235,334 B1 * | 8/2012 | Kobal | ............... | 248/122.1 |
| 2001/0030269 A1 * | 10/2001 | Evans et al. | ............... | 248/214 |
| 2004/0206868 A1 * | 10/2004 | Kaufman | ............... | 248/214 |
| 2006/0183396 A1 * | 8/2006 | Kanahele et al. | ............... | 446/26 |
| 2010/0001153 A1 * | 1/2010 | Stenhouse et al. | ............... | 248/222.13 |

* cited by examiner

*Primary Examiner* — Nkeisha Smith
(74) *Attorney, Agent, or Firm* — McKinney Law, PLLC

(57) ABSTRACT

A luggage connector that may be used with a baby stroller or wheelchair to transport rolling luggage is disclosed. In a particular embodiment, the connector includes a first arm and a second arm. Clamps are disposed at a distal end of each arm. The clamps are used to secure the connector to a handle of luggage and a portion of a frame such as a stroller or wheelchair frame. Each arm is adapted to rotate about a central axis so that each respective clamp may be rotated and positioned appropriately to secure the connector to the frame. In addition, a rotating hinge is provided to adjust to a desired angle between the two arms to accommodate the connector being secured to the frame and rolling luggage.

4 Claims, 6 Drawing Sheets

1

LUGGAGE SUPPORT ARM

I. CROSS REFERENCE TO RELATED APPLICATIONS

This application claims the benefit of U.S. Provisional Application No. 61/357,563 filed Jun. 23, 2010. The disclosure of the provisional application is incorporated herein by reference.

II. FIELD

The present disclosure is generally related to a luggage connector that may be used with a baby stroller or wheelchair, for example. In addition, the connector may be used to secure two pieces of luggage together.

III. DESCRIPTION OF RELATED ART

Most travelers today use luggage that includes wheels that allow the traveler to pull the luggage behind them. A retractable handle is usually integrated into the luggage and extends out from the top of the luggage. The rolling luggage is particularly useful in airports where there are relatively long distances to walk from the parking lots to check-in, through security and to the gates for boarding. In addition, travelers with young children often use strollers to transport their children through the airports. However, it is difficult for a traveler to push a stroller while pulling rolling luggage. Accordingly, there is a need for a device to allow a traveler to easily push a stroller while pulling rolling luggage.

However, in view of the prior art at the time the present invention was made, it was not obvious to those of ordinary skill in the pertinent art how the identified needs could be fulfilled.

IV. SUMMARY

In a particular embodiment, a luggage connector is disclosed. The connector includes a first arm and a second arm. Clamps are disposed at a distal end of each arm. The clamps are used to secure the connector to a handle of luggage and a portion of a stroller frame. Each arm is adapted to rotate about a central axis so that each respective clamp may be rotated and positioned appropriately to secure the connector to a luggage handle or stroller frame, for example. In addition, a rotating hinge is provided to adjust to a desired angle between the two arms to accommodate the connector being secured to the stroller and rolling luggage. The rotating hinge may include a top portion, where a gear is adapted to lock within lower teeth of a lower portion to maintain a desired angle between the arms. When the gear and lower teeth are disengaged, then the arms may be moved to the desired angle. The gear and lower teeth are then reengaged to lock the hinge at the desired angle. The means to operate the rotating hinge may include a spring loaded button or other mechanical means well known in the art.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
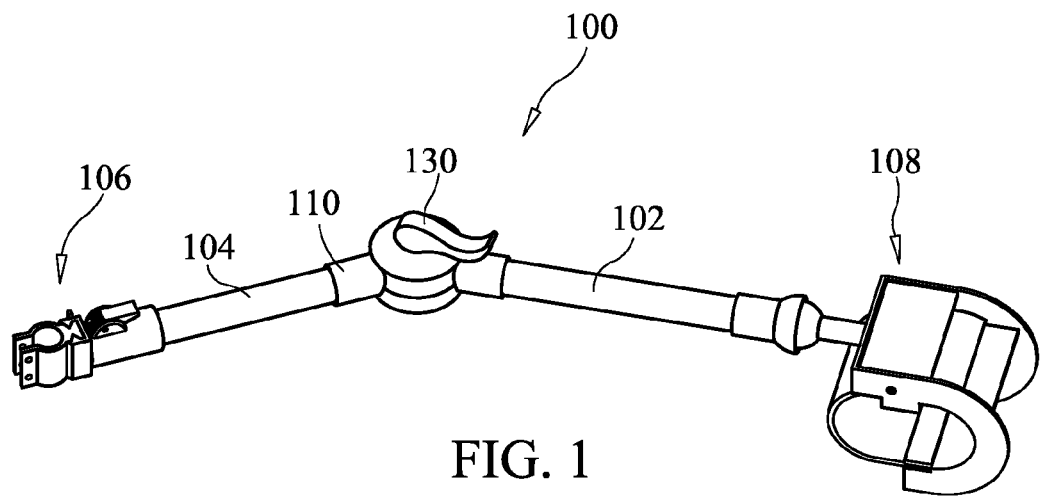
FIG. 1 is a top perspective view of a particular embodiment of a luggage connector.
Figure 2:
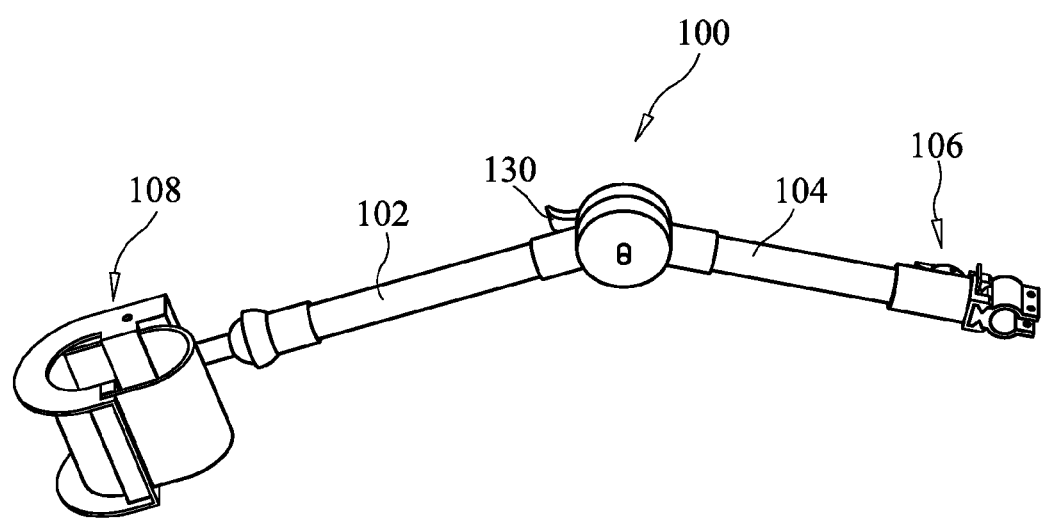
FIG. 2 is a bottom perspective view of a particular embodiment of the luggage connector of FIG. 1.

A first particular illustrative embodiment of a luggage connector is disclosed in FIGS. 1 and 2 and generally designated 100. The connector 100 includes a first arm 102 and a second arm 104. A first clamp 108 and second clamp 106 are disposed at a distal end of the respective arm 102, 104. The clamps 106, 108 are used to secure the connector 100 to a handle of luggage and a portion of a stroller or wheelchair frame, for example. A stroller or wheelchair typically includes a frame where portions of the frame are exposed and not covered with a fabric portion of the stroller. The clamps 106, 108 are adapted to slide over and otherwise attach to the frame portion and luggage handles. In addition, the connector 100 may be used with a cart or other types of rolling transportation. Second clamp 106 is preferably used to secure to the stroller or wheelchair frame and first clamp 108 is preferably used to grip a round or square shaped object such as a handle or frame member using a strap described below.

A proximate end of the first arm 102 is secured to the rotating hinge 110 and a proximate end of the second arm 104 is also secured to the rotating hinge 110. Accordingly, the first arm 102 and the second arm 104 are independently adjustable relative to one another using the rotating hinge 110. A locking flip lever 130 is used to secure the respective arms 102, 104 at the desired position. In operation, the locking flip lever 130 is flipped up to alleviate the pressure holding the hinge 110 together about a central axis. When the locking flip lever 130 is flipped down, pressure and friction within the rotating hinge 110 prevent the hinge 110 and the arms 102, 104 from moving from the desired position.

Figure 3:
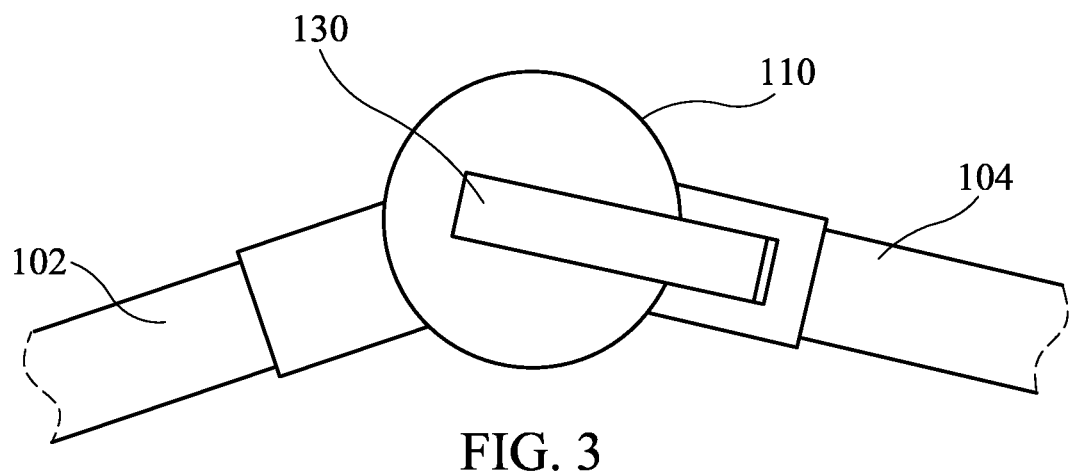
FIG. 3 is a partial view of the luggage connector.

Referring now to FIG. 3, each arm 102, 104 is adapted to rotate about a central axis so that the clamps 106, 108 may be rotated and positioned appropriately to secure the connector 100 to a luggage handle or stroller frame, for example. In addition, the rotating hinge 110 is provided to adjust to a desired angle between the two arms 102, 104 to accommodate the connector being secured to the stroller and rolling luggage. The greater the angle between the two arms 102, 104, the greater the distance between the stroller and luggage. Similarly, as the angle between the arms 102, 104 is decreased using the rotating hinge 110, the stroller and luggage will be positioned closer together. Each arm 102, 104 is rotated in conjunction with the rotating hinge 110 to accommodate the particular angle of the luggage handle to the stroller frame. Accordingly, the connector 100 is adaptable to be used with any stroller and luggage.

Figure 4:
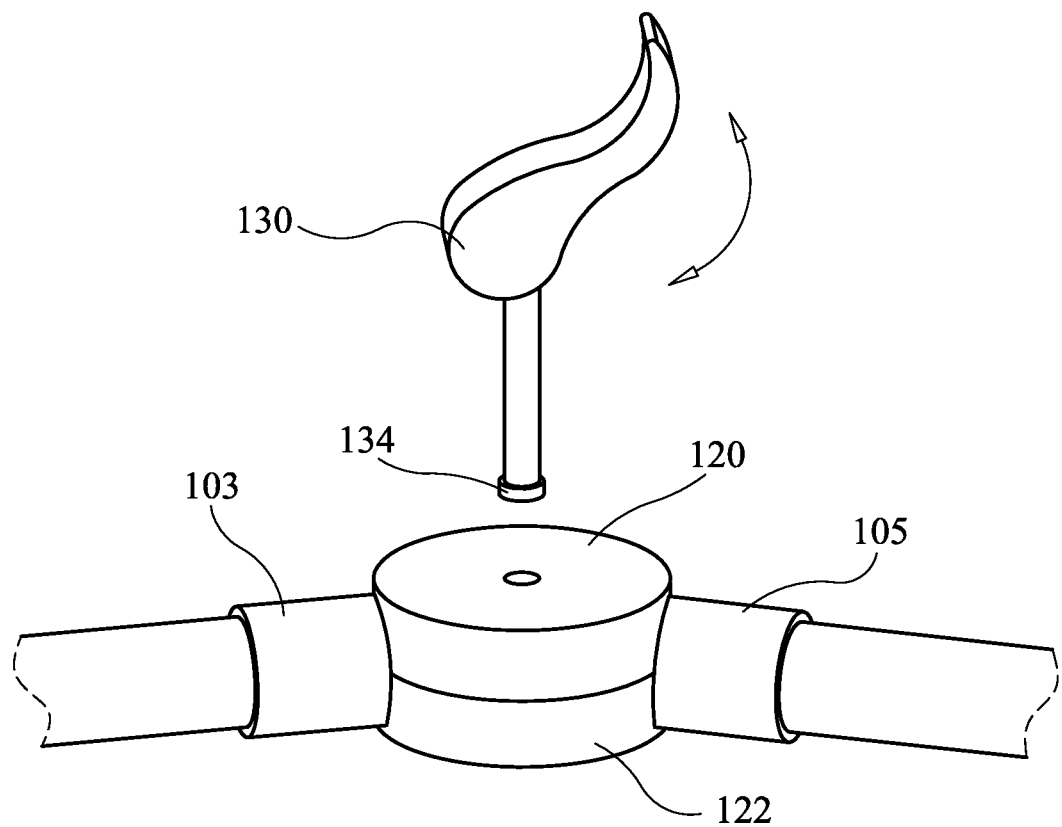
FIG. 4 is an exploded view of a rotating hinge of the luggage connector.

A particular embodiment of the rotating hinge 110 is shown in FIG. 4 for illustrative purposes. However, any means of locking the two arms 102, 104 at a desired angle relative to each other may be used with the connector 100. The rotating hinge 110 includes a top (or upper) portion 120 and a lower portion 122 that are adjacent and rotate to maintain a desired angle between the arms 102, 104. A gear may be used between the interface of the top portion 120 and a plurality of teeth or engaging ridges of the lower portion 122 to lock the hinge 110 in place. When the gear and plurality of ridges (or teeth) are disengaged, then the arms 102, 104 may be moved to the desired angle. The gear and lower teeth are then reengaged using the locking flip lever 130 and bolt 134 to lock the hinge 110 at the desired angle. In operation, the bolt 134 is inserted through the upper portion 120 and the lower portion 122 about a central axis and secured therein. The bolt 134 allows top 120 and bottom portions 122 to rotate. The locking flip lever 130 may include ergonomic curves to allow a user to easily grasp and turn the locking flip lever 130. The means to operate the rotating hinge 110 may include a spring loaded button or other mechanical means well known in the art. The rotating hinge 110 may also include tubular receptacles 103, 105 adapted to receive arms 102, 104, respectively, where tubular receptacle 103 may be secured to the upper portion 120 and receptacle 105 is secured to the lower portion 122.

Figure 5:
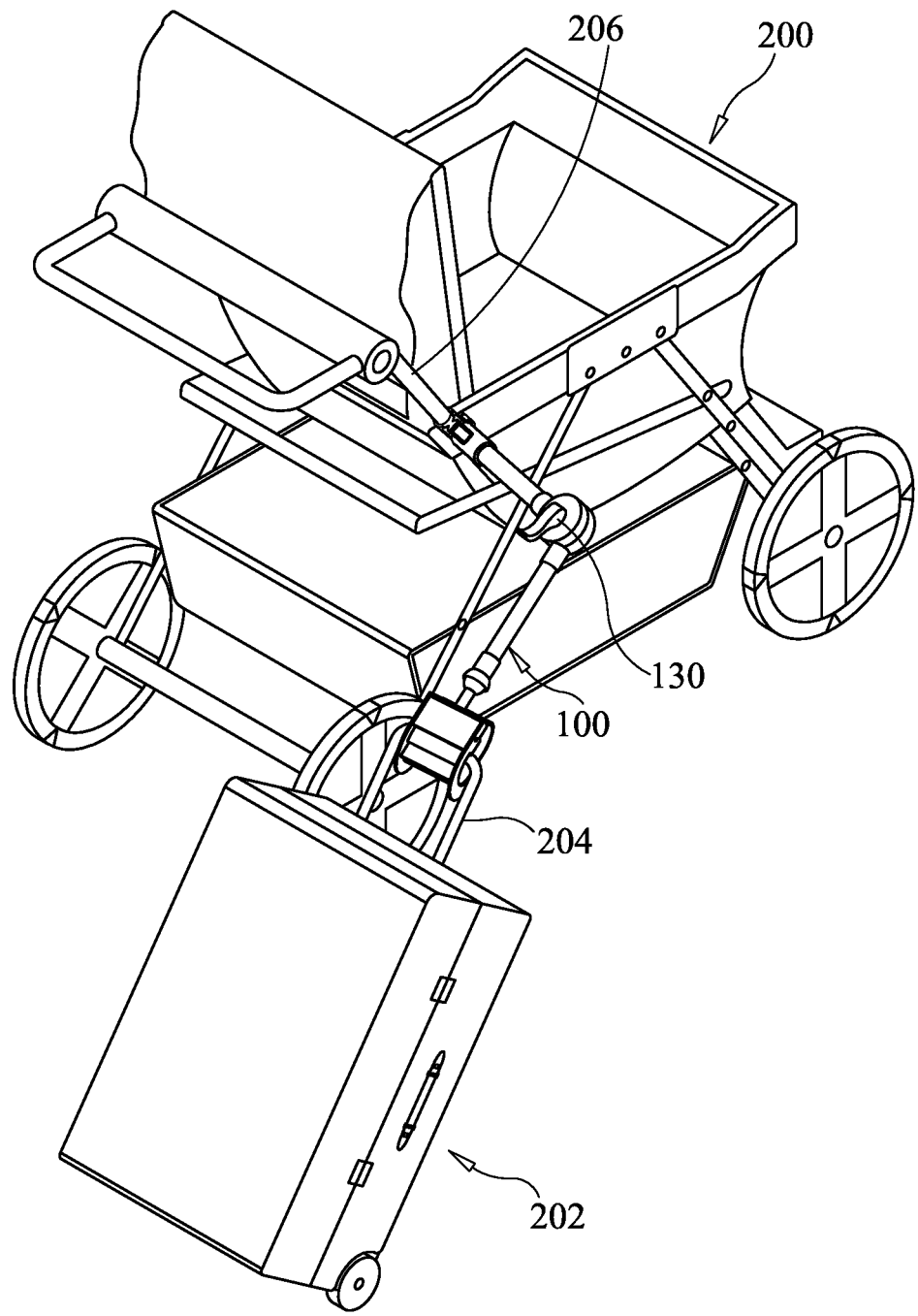
FIG. 5 is a perspective view of the connector secured to a stroller and rolling luggage.
Figure 6:
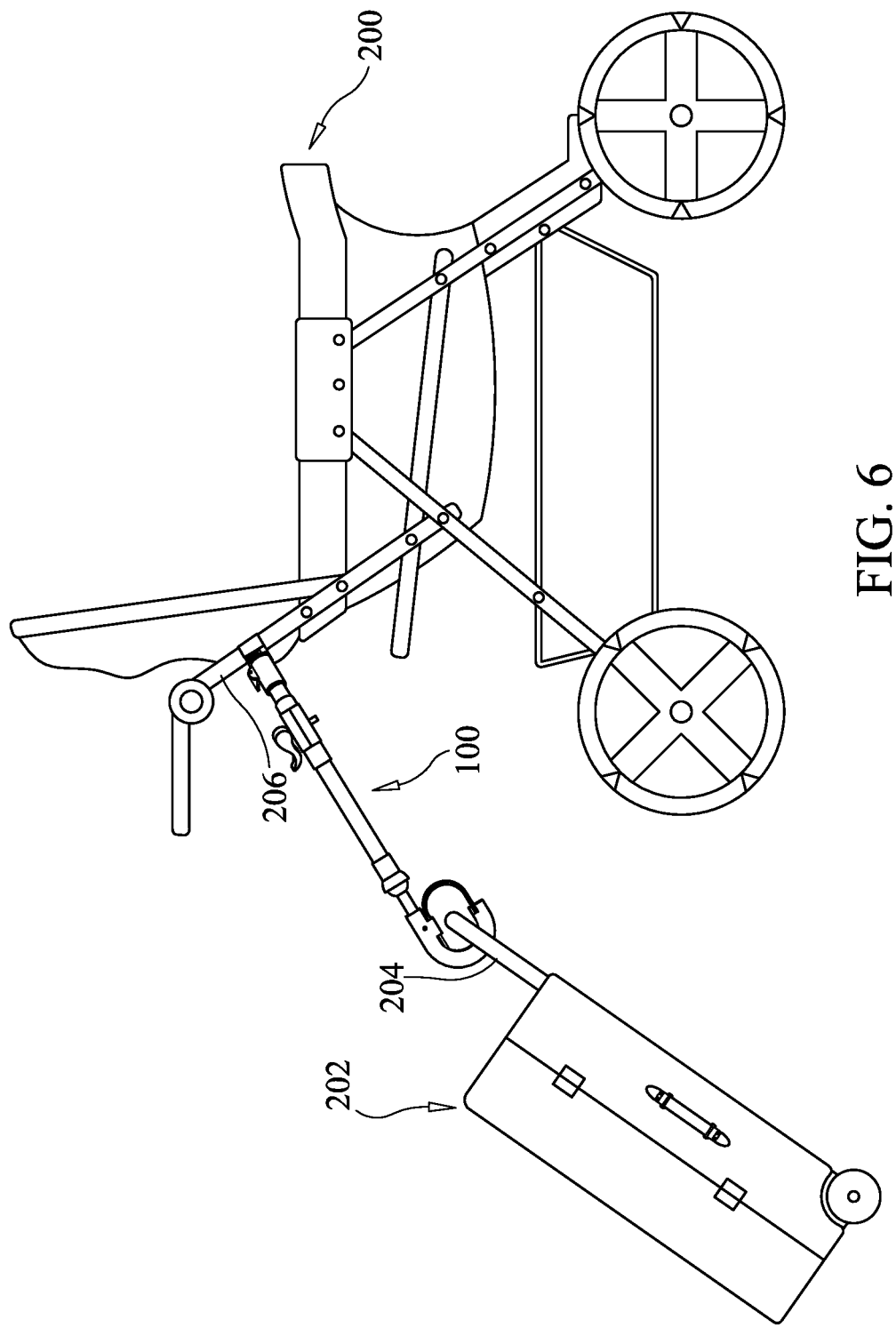
FIG. 6 is a side view of the connector in use with a stroller.
Figure 7:
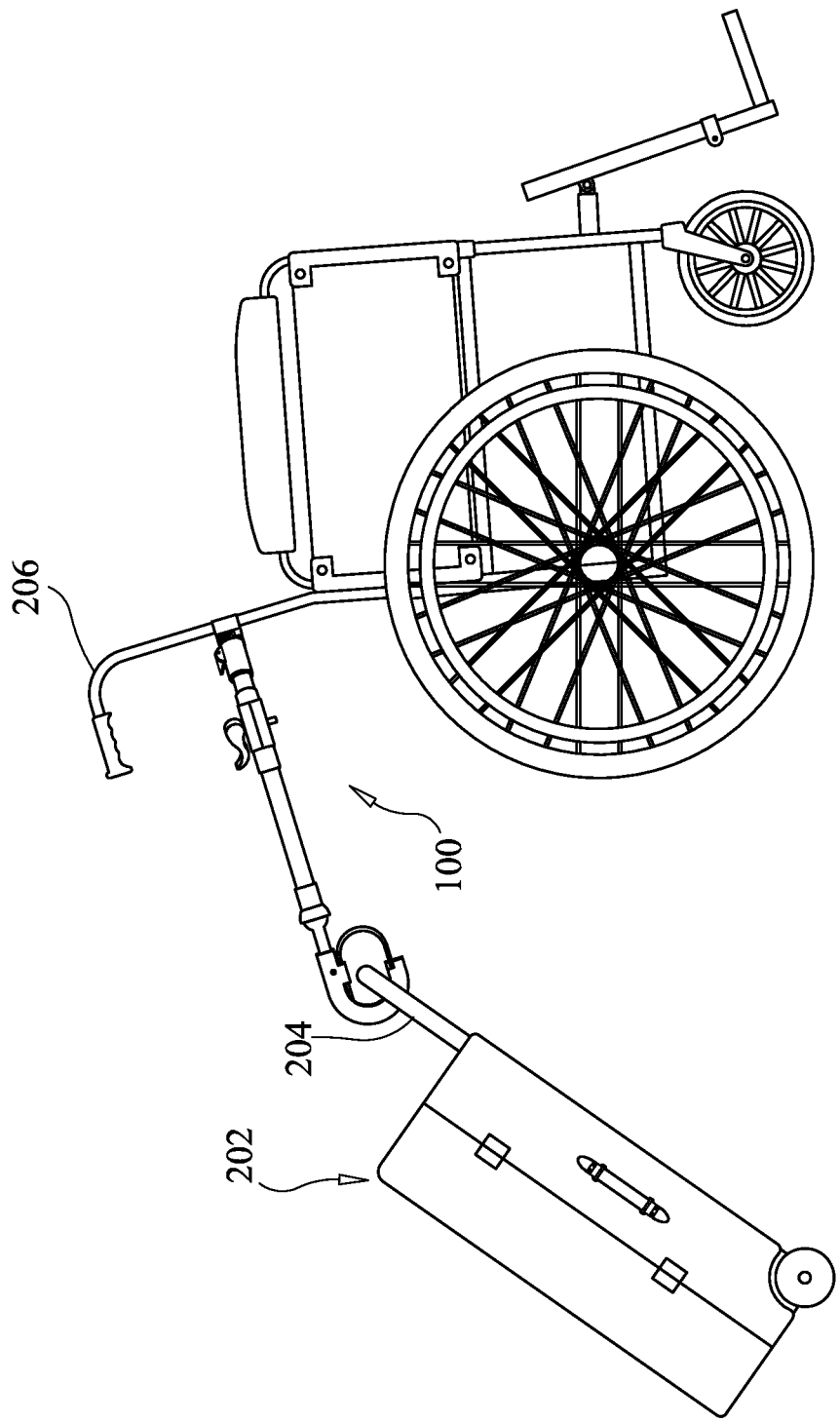
FIG. 7 is another side view of the connector in use with a wheelchair.

In operation, the connector 100 is secured to a stroller 200 and rolling luggage 202 as illustrated in FIGS. 5 and 6. The second clamp 106 is slipped over, or otherwise secured to, the frame 206 of the stroller 200. The second arm 104 is extended outwards from the stroller 200. The second arm 104 and the rotating hinge 110 are adjusted to the desired angle so that the luggage 202 will roll alongside a user (not shown). The first arm 102 is positioned generally perpendicular to the second arm 104 and the first clamp 108 secured to the luggage handle 204. The user may adjust the rotating hinge 110 and the arms 102, 104 to the desired configuration to allow the luggage 202 to be balanced on its rollers (e.g., wheels). The arms 102, 104 may be folded together when not in use to form a compact unit for storage. Similarly, the connector 100 may be used with a frame 206 of a wheelchair as illustrated in FIG. 7 or used to secure two pieces of luggage together.

Figure 8:
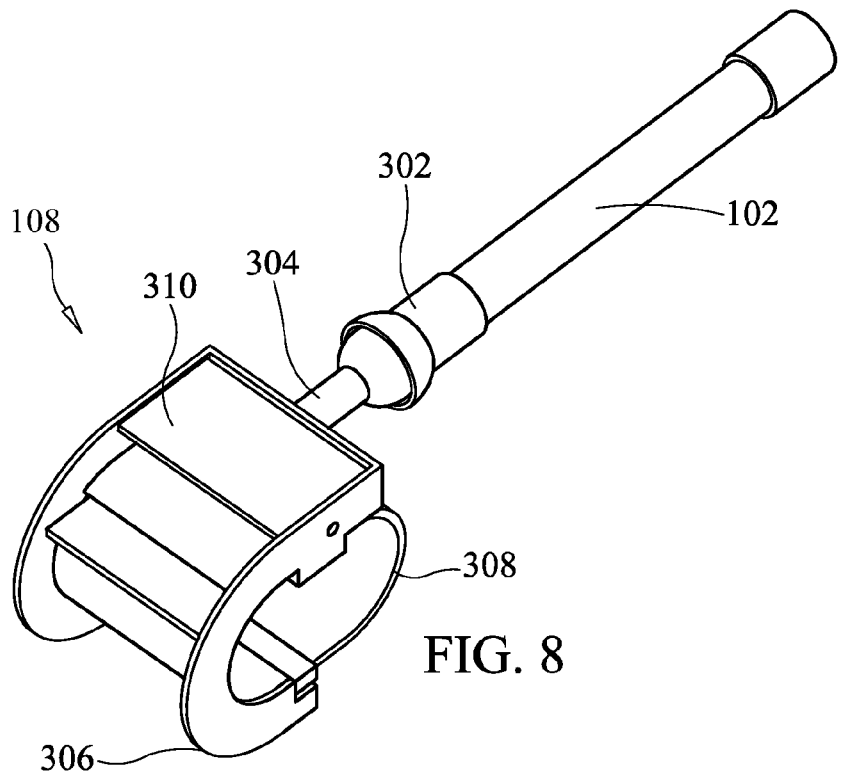
FIG. 8 is perspective view of a first clamp of the luggage connector.

Referring now to FIG. 8, the first clamp 108 includes first arm 102 that may have a ball and socket joint at its distal end. Preferably, the ball portion 304 is secured to the clamp 108 and the socket portion 302 is secured to the first arm 102. The first clamp 108 includes a strap 308 that may be used to secure a luggage handle therein as the strap 308 is passed through a buckle 310. The buckle 310 is adaptable to flip open to pull the strap through, then the buckle 310 is flipped closed (as shown in FIG. 8) when the strap 308 is at the desired length.

Figure 9A:
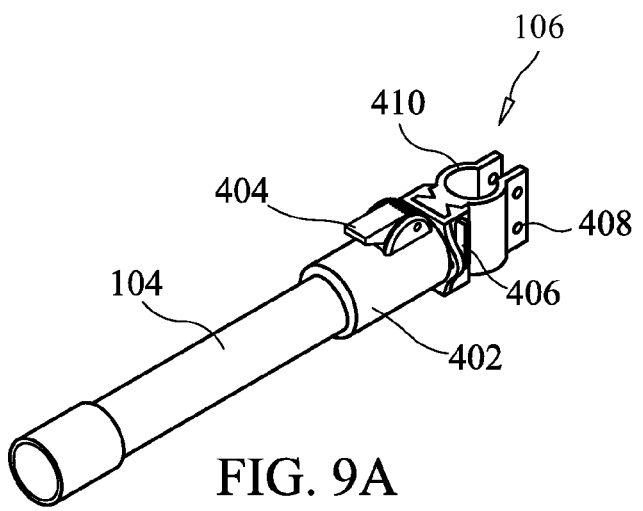
FIG. 9A is a perspective view of the second clamp of the luggage connector.
Figure 9B:
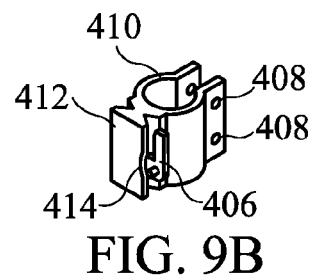
FIG. 9B is a perspective view of the removable bracket of the second clamp shown in FIG. 9A.

FIGS. 9A and 9B illustrate a particular embodiment where the second clamp 106 includes a removable bracket 410 adaptable to secure to a stroller or wheelchair frame, for example. The removable bracket 410 may include a male portion 412 about the periphery to slidingly engage a female receptacle disposed on the distal end of the second arm 104. The second clamp 106 may also include a cylinder 402 and a top flip lever 404 configured to receive and secure the second arm 104 to the second clamp 106. The removable bracket 410 includes a side flip lever 406 disposed along a side of the male portion 412 of the removable bracket 410 to secure the male portion 412 to the female receptacle. A partial semi-circle 414 is disposed along an edge of the male portion 412 to allow the side flip lever 406 to flip down (as shown in FIG. 9A) and hold the distal end of the second arm 104 firmly in place to the removable bracket 410. Bolts are other similar means may be used to secure the removable bracket 410 to a stroller frame, for example, using the holes 408. Accordingly, once the removable bracket 410 is secured to a stroller or wheelchair frame, the male portion 412 may slidingly engage the female receptacle as desired to quickly and easily disconnect the second arm 104 from the second clamp 106 and whatever frame it may be secured. In alternative embodiments, the clamps may be both of the same type, or other variations of clamps that perform substantially the same function.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A luggage connector, the connector comprising:
a rotating hinge;
a first arm having a proximate end secured to the rotating hinge;
a second arm having a proximate end secured to the rotating hinge;
a first clamp secured to a distal end of the first arm;
a second clamp secured to a distal end of the second arm;
wherein the first arm and the second arm are independently adjustable relative to one another using the rotating hinge;
a ball and socket joint secures the first clamp to the distal end of the first arm;
an adjustable strap of the first clamp is adapted to secure a luggage handle therein, wherein a buckle secures the strap at a desired length;
a removable bracket of the second clamp is adapted to secure the second arm to a frame;
the removable bracket further comprising a male portion about a periphery to slidingly engage a female receptacle disposed on the distal end of the second arm;
the second clamp further comprising a top flip lever configured to secure the second arm to the second clamp;
the rotating hinge further comprising an upper portion and a lower portion, wherein the upper portion and the lower portion are adapted to lock together to maintain a desired angle between the first and second arms, and a locking flip lever disposed through a central portion of the rotating hinge to lock the rotating hinge at the desired angle;
the removable bracket further comprising a side flip lever disposed along a side of the male portion of the removable bracket to secure the male portion to the female receptacle.

2. The connector of claim 1, wherein the rotating hinge further comprising a plurality of engaging ridges between an interface of the upper portion and the lower portion to assist to lock the rotating hinge at the desired angle.

3. The connector of claim 2, wherein the first arm is secured to the upper portion of the rotating hinge and the second arm is secured to the lower portion of the rotating hinge.

4. The connector of claim 3, wherein the frame is one of a wheelchair frame or stroller frame.

* * * * *